Nov. 6, 1951          W. G. SPENCER          2,573,996
SIDE WALL FOR BICYCLE WHEELS AND TIRES
Filed March 24, 1949

INVENTOR:
WILLIAM G. SPENCER.
BY
ATTORNEY.

Patented Nov. 6, 1951

2,573,996

UNITED STATES PATENT OFFICE 2,573,996

SIDE WALL FOR BICYCLE WHEELS
AND TIRES

William G. Spencer, Burbank, Calif.

Application March 24, 1949, Serial No. 83,194

2 Claims. (Cl. 301—37)

The present invention relates to a construction which permits existing bicycles to have applied to the rims a white side wall. At the present time, it is customary in automobiles to provide a side wall formed of plastic, metal or other material, which covers the outer side wall of the tire casing to cause the tire to appear as being white with a black tread. The present invention relates to a novel means whereby white side walls are applied to a bicycle, without the necessity of removing the wheels from the bicycle.

It is appreciated that the modern bicycle comes equipped with mud guards and that the mechanism is very compact and does not permit ready removal of a wheel. Accordingly, the present invention has for an object, a white side wall construction which can be applied to the tires without removal of wheels, and in a simple and expeditious manner.

A further object is the provision of a white side wall construction for bicycle tires which acts to protect the tire against side cuts or bruises, which is ornamental in appearance, does not add appreciably to the weight of the bicycle, which can be easily balanced, and is of inexpensive construction.

In the drawing,

Figure 2 is an enlarged transverse sectional view of a bicycle tire and its rim incorporating the side wall construction of the invention;

Figure 3 is a fragmentary perspective view of the side wall construction; and

Figure 4 is a view looking in the direction of the arrows 4—4, Figure 1, the tire being removed from the bicycle rim.

Figure 1:
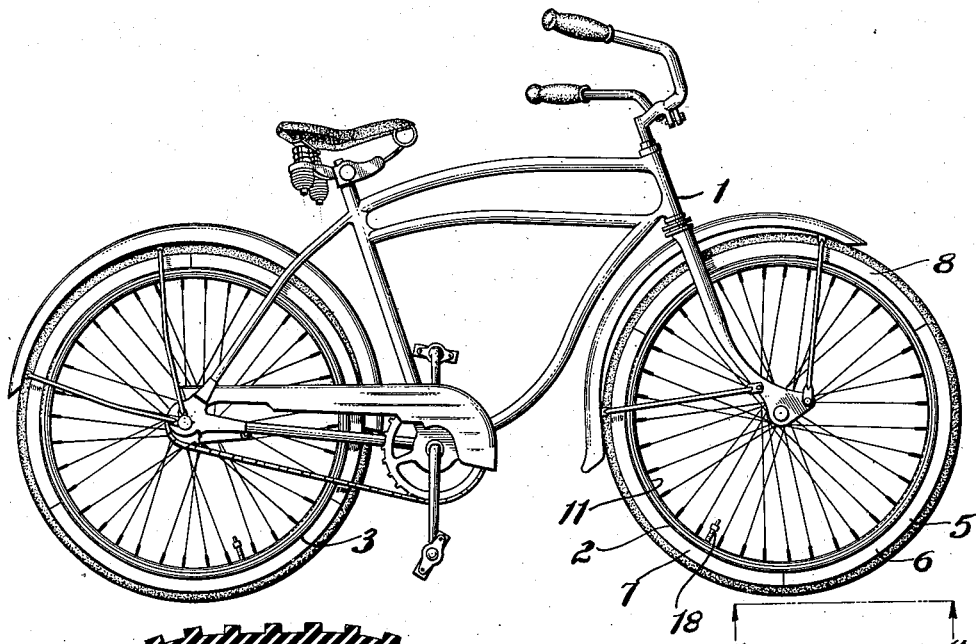
Figure 1 is an elevation of the bicycle, the wheels of which incorporate the invention.
Figure 1:
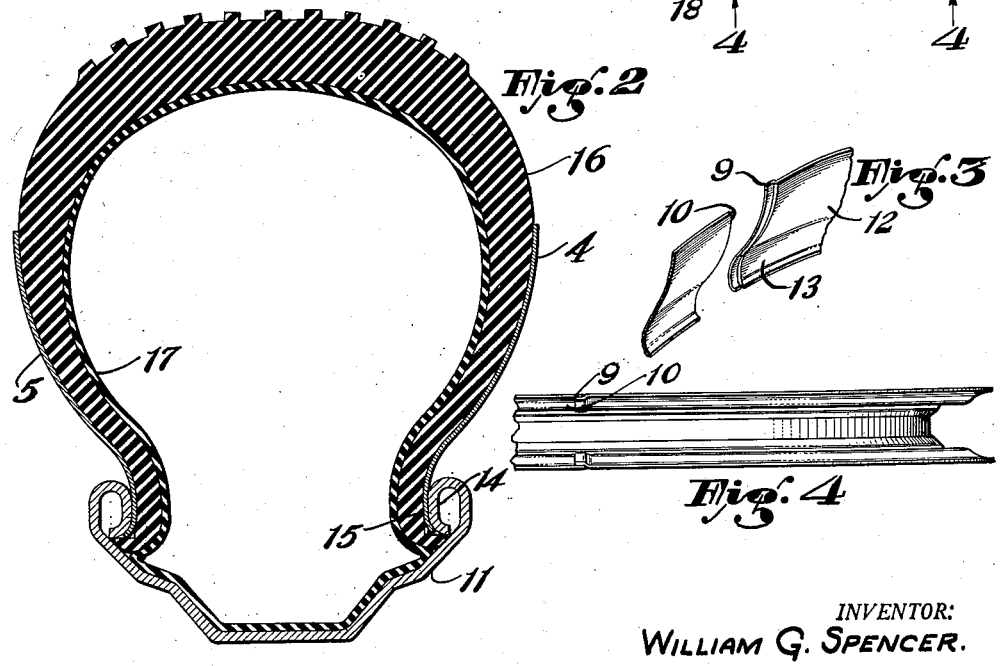

Referring now to the drawing, I have shown in Figure 1 a bicycle designated as an entirety by 1, and the same includes front and rear rubber tired wheels 2 and 3 respectively. For the purpose of enhancing the appearance of the tires, and in accordance with modern trend in automobile practice, I have provided for each side of a tire, side wall members 4 and 5. Each complete side wall member is formed in two or more sections, in the present instance three, as shown at 6, 7 and 8 for the front wheel, and each section interlocks with the following section by providing one end of a section with an offset portion 9, while the opposite end is planar as shown at 10 in Figure 3, and adapted to fit within the offset 9.

The offset is equal to the thickness of a section so that the external surface of the sections are smooth and in abutting relationship. In placing the sections on the sides of a tire, the tire is partly deflated whereupon a section is inserted between the wheel rim 11 and the outer face of the tire, as shown in Figure 2. The section is reversedly curved or sinuous in cross section, that is, has a convex portion 12 and a connecting concave portion 13, the concave portion fitting between the clencher 14 of the rim and the bead 15 of the tire 16.

Each section is placed in position so that the final appearance after the three sections are interconnected is as shown in Figure 1. After one side of a tire has been provided with a side wall, the procedure is repeated for the opposite side of the tire, followed by inflating the tire in the usual manner, which is to say, the inner tube 17 is inflated to a given pressure through valve 18. When this occurs, the concave portions of the side walls are securely held between the clencher rim 14 and the outer surface of the tire at the bead portions thereof.

The side wall members may be comparatively light and formed of metal or a plastic and while normally such side wall members might be white in color, it is apparent that they could be of any color, to suit individual fancy. The arrangement shown for the side wall members causes the side wall members to closely engage and follow the contour of the side walls of the tire.

In addition, to enhance the ornamental appearance of the bicycle as a whole and the tires in particular, the side wall members act to prevent puncture of the tires when striking sharp rocks, glass or other objects. As most bicycles have standard diameter wheels, the side walls become a standardized manufactured product. It is quite apparent that each section is really a sector and that the number of sectors will depend upon the arc of each individual section of a side wall member, considered as an entirety.

The construction illustrated and described has been found to be practical in actual use and service.

I claim:

1. The combination with a bicycle rim and its tire, of a side wall member for said tire and interposed in part between the tire and the rim, said side wall member comprising three sections of annular sector form, each section provided with an offset end and a planar end, the offset end of one section cooperating with the planar end of an adjacent section.

2. The combination with a bicycle rim and its tire, of a side wall member for said tire and interposed in part between the rim and the tire for maintaining the side wall member in position of service, said side wall member engaging the side of the tire and having three separable and interconnecting sections.

WILLIAM G. SPENCER.

REFERENCES CITED

The following references are of record in the file of this patent:

UNITED STATES PATENTS

| Number | Name | Date |
|---|---|---|
| 2,107,783 | Frey | Feb. 8, 1938 |
| 2,334,388 | Daniel | Nov. 16, 1943 |
| 2,488,864 | Handy | Nov. 22, 1949 |

FOREIGN PATENTS

| Number | Country | Date |
|---|---|---|
| 605,436 | France | May 26, 1926 |